United States Patent
Moiseev (10) Patent No.: US 8,634,209 B2
(45) Date of Patent: Jan. 21, 2014

(54) CURRENT-FED FULL-BRIDGE DC-DC CONVERTER

(71) Applicant: Kabushita Kaisha Toyota Jidoshokki, Kariya (JP)

(72) Inventor: Sergey Moiseev, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 0 days.

(21) Appl. No.: 13/845,319

(22) Filed: Mar. 18, 2013

(65) Prior Publication Data

US 2013/0322127 A1    Dec. 5, 2013

(51) Int. Cl.
*H02M 1/34* (2007.01)

(52) U.S. Cl.
USPC ............... 363/17; 363/56.05; 363/98

(58) Field of Classification Search
USPC .......... 363/17, 56.02, 56.05, 98, 132
See application file for complete search history.

(56) References Cited

U.S. PATENT DOCUMENTS

| 5,430,632 | A  | * | 7/1995 | Meszlenyi | 363/17 |
| 7,515,445 | B2 | * | 4/2009 | Lin | 363/98 |
| 8,027,179 | B2 | * | 9/2011 | Hallak | 363/98 |
| 2008/0013346 | A1 | * | 1/2008 | Westmoreland et al. | 363/37 |

FOREIGN PATENT DOCUMENTS

| JP | 60/15437 | 2/1985 |
| JP | 2002/272135 | 9/2002 |

* cited by examiner

*Primary Examiner* — Jessica Han
(74) *Attorney, Agent, or Firm* — Woodcock Washburn LLP (57) ABSTRACT

A current-fed full-bridge DC-DC converter includes a current source circuit including a direct-current voltage source circuit and a reactor connected to the direct-current voltage source circuit in series, an inverter circuit including switching elements, input terminals and output terminals, wherein outputs of the current source circuit are connected to the input terminals, a transformer having a primary coil that is connected to the output terminals and a secondary coil and a rectifier circuit which is connected to the secondary coil and through which the current-fed full-bridge DC-DC converter generates direct-current output. The current-fed full-bridge DC-DC converter further includes a capacitor connected to the output terminal and the primary coil in series and a controller controlling on/off operations of the switching elements so that a current can flow from the current source circuit through the primary coil and the capacitor in stopping of the current-fed full-bridge DC-DC converter.

3 Claims, 6 Drawing Sheets

CURRENT-FED FULL-BRIDGE DC-DC CONVERTER

CROSS REFERENCE TO RELATED APPLICATIONS

This application claims priority to Japanese application no. 2012-123998 filed May 31, 2012.

BACKGROUND

The present invention relates generally to a DC-DC converter and more specifically to a current-fed full-bridge DC-DC converter that converts direct-current power into different direct-current power.

A vehicle or a transport machinery (hereinafter referred to collectively as vehicle) that is equipped with an electric motor in addition to an engine for driving the vehicle has been put into practice, such as a hybrid car, a plug-in hybrid vehicle, a hybrid vehicle or a hybrid electric vehicle. There has been recently proposed a plug-in hybrid vehicle whose battery can be charged by system power supply such as household power supply.

Such vehicle is equipped with a traction motor operating at a high voltage. A DC voltage of a battery for driving the vehicle is boosted by a DC-DC converter to another DC voltage that is high enough to drive the traction motor. Thus, the traction motor is operated at the boosted DC voltage. While the vehicle is being slowed down, the traction motor serves as a generator. The voltage of the electric power thus generated by the motor is converted into a battery voltage that is suitable for driving the vehicle, and the power with such converted voltage is used for charging the battery.

The DC-DC converter that converts DC power into different DC power is also used for a solar power system, various electronic devices and appliances such as a television set and a charger for a mobile phone or a computer.

In DC-DC converters, a current-fed full-bridge DC-DC converter has been known. The current-fed full-bridge DC-DC converter is configured so that inputs of an inverter circuit are connected to outputs of a direct-current voltage circuit that is connected in series to a coiled reactor serving as a stationary induction device having an induction effect. Outputs of the inverter circuit are connected to the primary coil of a transformer. The secondary coil of the transformer is connected to a rectifier circuit so that DC power is produced.

The current-fed full-bridge DC-DC converter is characterized in that the input current has a DC continuous waveform with ripples and the input current waveform may be rectified into sinusoidal DC waveform having good power factor and no distortion with a simple converter circuit.

In the DC-DC converter, power conversion is accomplished by switching rapidly the switching elements such as MOSFET (Metal Oxide Semiconductor Field Effect Transistor MOS) or IGBT (Insulated Gate Bipolar Transistor) on and off repeatedly. During the switching operation, the current flowing in the DC-DC converter is changed rapidly, so that overvoltage (or surge voltage) occurs due to the parasitic inductance and capacitance of the DC-DC converter.

In the current-fed full-bridge DC-DC converter, the direct-current circuit including the voltage circuit and the reactor is connected to the transformer through the switching elements of the inverter circuit. There exists a leakage inductance of the transformer in the current path in which the transformer is connected and furthermore the switching elements of the inverter circuit have a parasitic capacitance. During the operation of the current-fed full-bridge DC-DC converter, energy is accumulated in the reactor and the leakage inductance from the current flowing from the current source circuit. If the switching elements of the inverter circuit are turned off rapidly when the current-fed full-bridge DC-DC converter need be stopped, e.g. for the purpose of protection thereof, the energy is accumulated in the reactor and the leakage inductance, but has nowhere to go, so that the parasitic capacitance of the switching elements of the inverter tends to be charged quickly, with the result that overvoltage is generated to the switching elements. If the overvoltage exceeds the withstand voltage of the switching elements, the switching elements may be damaged. To protect the switching elements from such damage, appropriate measures need be taken.

For preventing the switching elements of a current-fed full-bridge DC-DC converter from being damaged by overvoltage generated in the current-fed full-bridge DC-DC converter, Japanese Patent Application Publication 2002-272135 discloses a current-fed full-bridge DC-DC converter to which a snubber circuit is connected for suppressing overvoltage that occurs when each switching element is turned off However, this current-fed full-bridge DC-DC converter is disadvantageous in that the number of parts is increased thereby to bring about an increased cost and also increased loss of circuit during the normal operation of the current-fed full-bridge DC-DC converter.

The present invention is directed to providing a current-fed full-bridge DC-DC converter that has a simple structure and prevents the current-fed full-bridge DC-DC converter from generating an overvoltage in stopping of the current-fed full-bridge DC-DC converter.

SUMMARY

A current-fed full-bridge DC-DC converter includes a current source circuit including a direct-current voltage source circuit and a reactor connected to the direct-current voltage source circuit in series, an inverter circuit including switching elements, input terminals and output terminals, wherein outputs of the current source circuit are connected to the input terminals, a transformer having a primary coil that is connected to the output terminals and a secondary coil and a rectifier circuit which is connected to the secondary coil and through which the current-fed full-bridge DC-DC converter generates direct-current output. The current-fed full-bridge DC-DC converter further includes a capacitor connected to the output terminal and the primary coil in series and a controller controlling on/off operations of the switching elements so that a current can flow from the current source circuit through the primary coil and the capacitor in stopping of the current-fed full-bridge DC-DC converter.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF ILLUSTRATIVE EMBODIMENTS

The following will describe the current-fed full-bridge DC-DC converter according to the preferred embodiment of the present invention with reference to the accompanying drawings. The current-fed full-bridge DC-DC converter according to the preferred embodiment of the present invention is generally shown in FIG. 1.

Figure 1:
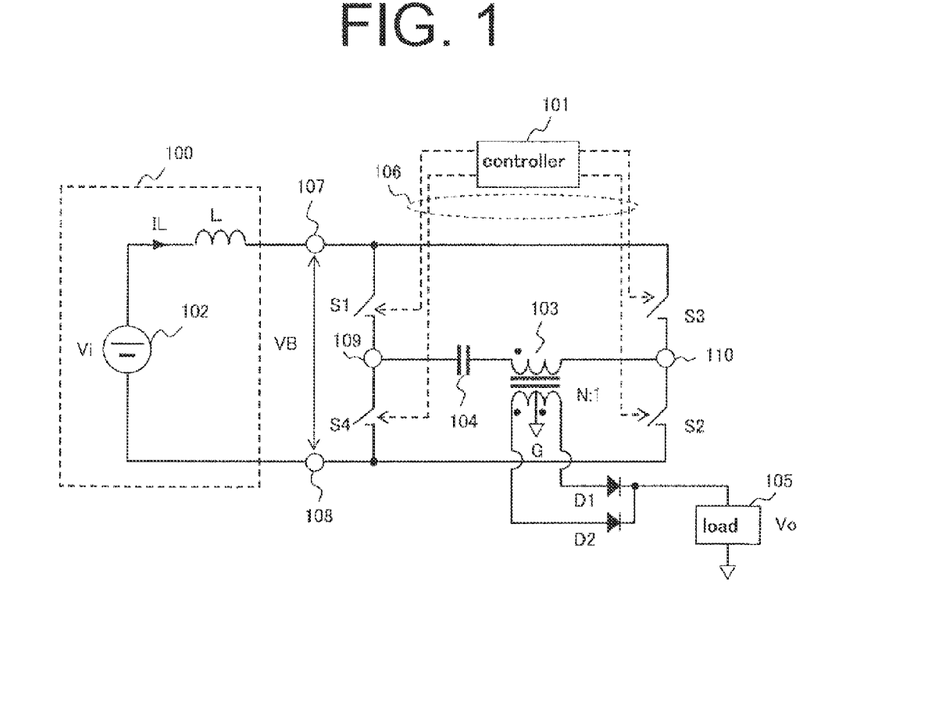
FIG. 1 is a circuit diagram of a current-fed full-bridge DC-DC converter according to a preferred embodiment of the present invention.

Referring to FIG. 1, the current-fed full-bridge DC-DC converter includes a current source circuit 100. The current source circuit 100 includes a DC (direct current) voltage source circuit 102 and a reactor L that is connected to the voltage source circuit 102 in series. The reactor L is a coiled stationary induction device having an induction effect.

The current-fed full-bridge DC-DC converter further includes an inverter circuit having switching elements S1, S2, S3 and S4, a controller 101, a transformer 103 having a primary coil and a secondary coil, a capacitor 104, a plurality of control lines 106, input terminals 107, 108 and output terminals 109, 110. The input terminals 107, 108 of the inverter circuit are connected to outputs of the current source circuit 100. The output terminals 109 and 110 of the inverter circuit are connected to the primary coil of the transformer 103. In the inverter circuit, one or first terminals of the switching elements S1 and S3 are connected to the input terminal 107 and one or first terminals of the switching elements S2 and S4 are connected to the input terminal 108. The other or second terminals of the switching elements S1 and S4 are connected to the output terminal 109 and the other or second terminals of the switching elements S2 and S3 are connected to the output terminal 110. The switching elements S1 through S4 are made of MOSFET or IGBT.

The capacitor 104 is connected between and in series to the primary coil of the transformer 103 and the output terminal 109. The capacitor 104 doubles also to serve to prevent the bias magnetism generated by the exciting inductance of the transformer 103.

The secondary coil of the transformer 103 is connected at the center thereof to the ground G and at the opposite ends thereof to a load 105 as the external output through rectifier diodes D1 and D2 serving as the rectifier circuit of the present invention. The load 105 may be, e.g. a driving motor or a battery.

The controller 101 may be provided, e.g. by a microcomputer including a memory storing therein a control program and a processor that executes the control program as will be described below. During the normal operation of the current-fed full-bridge DC-DC converter, the controller 101 controls the on/off operation of the switching elements S1 through S4 forming the inverter at a timing corresponding to any of four modes 1 through 4 as will be described later. Thus, the circuit shown in FIG. 1 operates as a DC-DC inverter. When the current-fed full-bridge DC-DC converter is stopped, e.g. for the purpose of protection thereof, the controller 101 controls the on/off operations of the switching elements S1 through S4 through the respective control lines 106 so that a current can flow from the current source circuit 100 through the primary coil of the transformer 103 and the capacitor 104. Specifically, when the current-fed full-bridge DC-DC converter is stopped for the protection thereof, the controller 101 turns off the switching elements S1 and S2 and turns on the switching elements S3 and S4.

At this time, the controller 101 causes a current due to the energy stored in the reactor L and the leakage inductance of the transformer 103 during the normal operation of the current-fed full-bridge DC-DC converter to flow through a path formed by the switching element S3, the primary coil of the transformer 103, the capacitor 104 and the switching element S4. As a result, a voltage potential difference is generated across the capacitor 104, which restricts an increase of the overvoltage VB between the input terminals 107, 108 connected to the current source circuit 100. Therefore, the switching elements S1 through S4 are protected against damage which may occur when the operation of the current-fed full-bridge DC-DC converter is stopped.

In this case, the capacitor 104 that is provided between the primary coil of the transformer 103 and the output terminal 109 and connected in series thereto also serves to prevent the transformer 103 from bias magnetism generated in the circuit shown in FIG. 1. The bias magnetism can occur when excitation current due to the parasitic exciting inductance of the transformer 103 is generated with a time lag among the switching elements S1 through S4 for any reason in controlling the switching elements S1 through S4 of the inverter circuit by the controller 101. When a DC current component in positive direction is generated in the primary coil of the transformer 103, a DC voltage component in positive direction is generated in the capacitor 104 due to the provision of the capacitor 104, so that the voltage between the opposite ends of the primary coil is decreased and the progress of the bias magnetism is prevented. Generation of an overvoltage (or a surge voltage) can be prevented by the current-fed full-bridge DC-DC according to the embodiment using a simple structure wherein the capacitor 104 serves as an anti-bias magnetism protection to prevent an overvoltage from being generated in controlling the on/off operation of the switching elements S1 through S4 in stopping of the current-fed full-bridge DC-DC converter.

Figure 2:
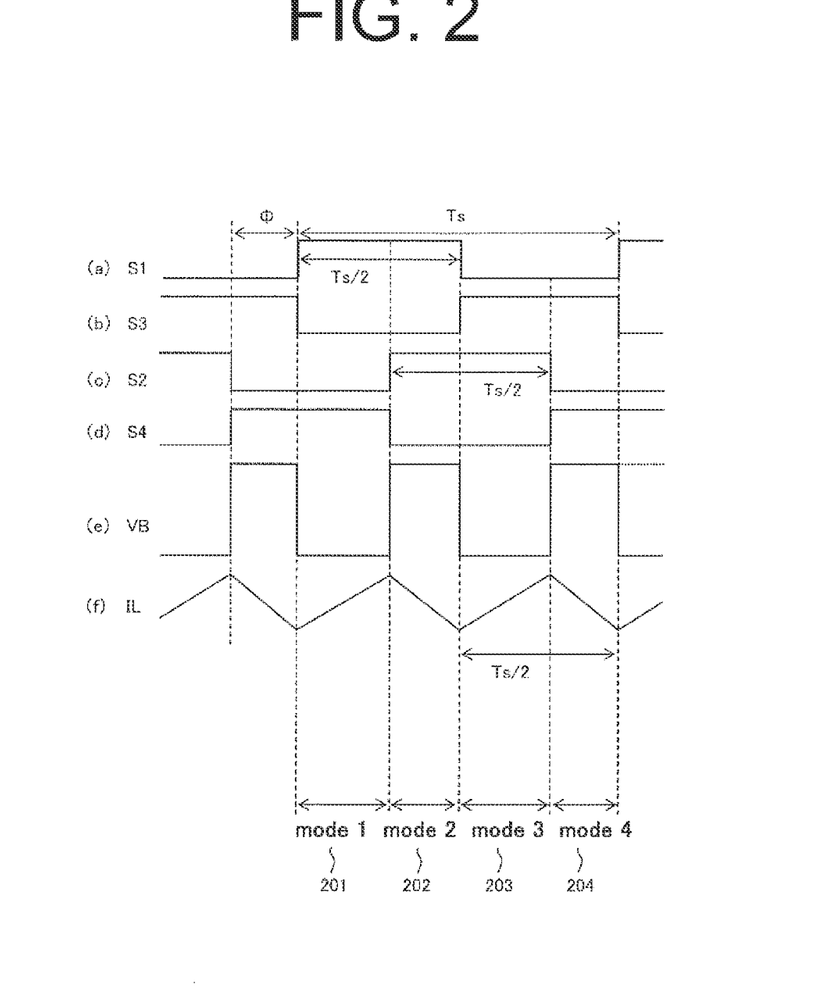
FIG. 2 is a timing chart illustrating the operation of the current-fed full-bridge DC-DC converter of FIG. 1.

FIG. 2 is the timing chart illustrating the operation of the current-fed full-bridge DC-DC converter according to the embodiment and FIGS. 3A, 3B and 4A, 4B are the schematic circuit diagrams illustrating mode 1 and mode 2 and mode 3 and mode 4, respectively, during the normal operation of the current-fed full-bridge DC-DC converter according to the embodiment. For the sake of convenience, the controller 101 shown in FIG. 1 is omitted in FIGS. 3A, 3B and 4A, 4B. The switching elements S1, S2, S3 and S4 will be simply referred hereinafter to as S1, S2, S3 and S4, respectively.

Referring FIG. 2, Ts in the timing chart indicates one cycle of operation of the switching elements S1 through S4 (S1, S2, S3, S4 corresponding to (a), (c), (b), (d) in FIG. 2, respectively). The duration of time when each of the switching elements S1 through S4 is in on state or in off state is Ts/2.

Referring to FIGS. 1 and 2, S1 and S3 connected to the input terminal 107 that is adjacent to the reactor L are controlled to be turned on and off in opposite phases. Specifically, while S1 is on (signal level being high in FIG. 2(a)), S3 is off (signal level being low in FIG. 2(b)) and vice versa. Similarly, S2 and S4 that are connected to the input terminal 108 on the opposite side of the reactor L from the input terminal 107 are controlled to be turned on and off in opposite phases. Specifically, while S2 is on (signal level being high in FIG. 2(c)), S4 is off (signal level being low in FIG. 2(d)) and vice versa.

As shown in FIG. 2, the signals of S1 and S3 and the signals of S2 and S4 are phase-shifted by the controller 101 by phase ø and the output voltage Vo of the load 105 is determined by the phase ø.

Figure 3A:
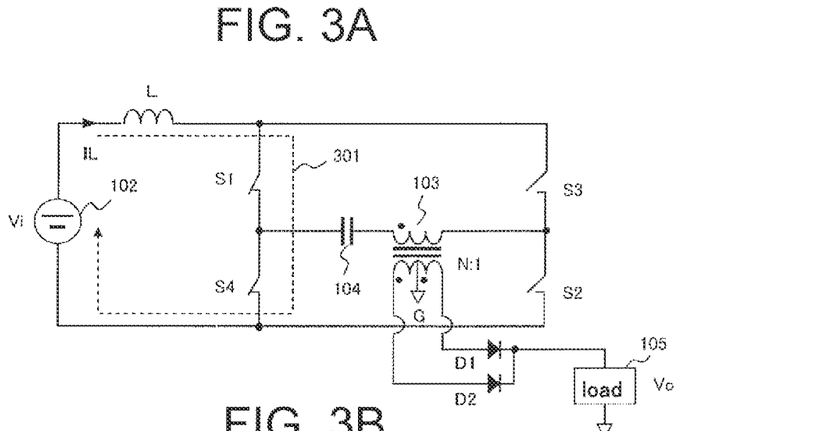
FIGS. 3A and 3B are schematic circuit diagrams illustrating mode 1 and mode 2, respectively, during the normal operation of the current-fed full-bridge DC-DC converter of FIG. 1.

Referring to the timing chart of FIG. 2, in the period 201, S1 and S4 are on and S2 and S3 are off. This period 201 will be referred hereinafter to as the mode 1. Referring to the schematic circuit diagram of FIG. 3A illustrating mode 1, current IL that is generated at the positive side of the voltage source circuit 102 flows to the negative side thereof through the reactor L, S1 and S4 in this order, as indicated by dashed arrow 301 in FIG. 3A. In the period 201 when S1 and S4 are both on, the voltage VB between the input terminals 107, 108 to which the current source circuit 100 is connected becomes zero as shown in FIG. 2(e). The current IL flowing through the reactor L increases linearly by the application of input voltage V1, as shown in FIG. 2(f), so that energy is accumulated in the reactor L. Thus, the mode 1 serves as the energy accumulation mode.

Figure 3B:
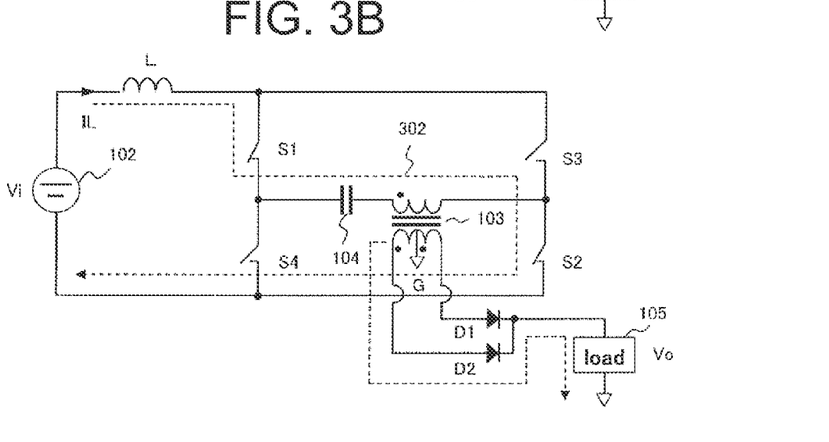

Referring to the timing chart of FIG. 2, in the period 202, S1 and S2 are on and S3 and S4 are off. The period 202 will be referred hereinafter to as the mode 2. Referring to the schematic circuit diagram of FIG. 3B illustrating the mode 2, the energy accumulated in the reactor L in mode 1 flows through S1, the capacitor 104 and the primary coil of the transformer 103 in this order and returns to the negative side of the voltage source circuit 102, as indicated by dashed arrow 302 in FIG. 3B. During the period 202, the energy accumulated in the reactor L is transferred from the primary coil of the transformer 103 to the secondary coil thereof. As a result, a current flows from the ground G of the secondary coil of the transformer 103 to the load 105 through the rectifier diode D2, so that a voltage V0 is generated at the load 105. In the period 202 when S1 and S2 are both on, the voltage VB between the input terminals 107, 108 which are connected to the current source circuit 100 becomes a predetermined high level voltage, as shown in FIG. 2(e), by the inductance of the capacitor 104 and the primary coil of the transformer 103. The current IL flowing through the reactor L decreases linearly as shown in FIG. 2(f). Energy is radiated from the reactor L and transferred to the secondary coil of the transformer 103. The mode 2 serves as the energy transfer mode.

Figure 4A:
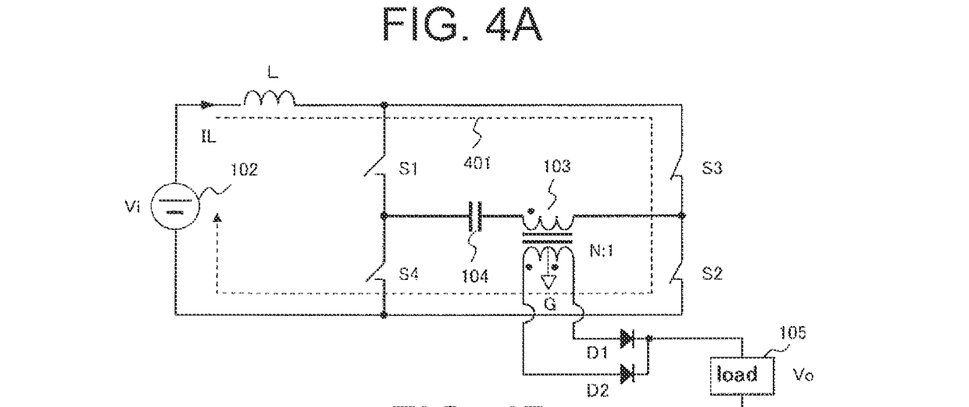
FIGS. 4A and 4B are schematic circuit diagrams illustrating mode 3 and mode 4, respectively, during the normal operation of the current-fed full-bridge DC-DC converter of FIG. 1.

Referring to the timing chart of FIG. 2, S1 and S4 are off and S2 and S3 are on in the period 203. The period 203 will be referred hereinafter to as the mode 3. The on/off states of the switching elements S1 through S4 in the mode 3 are opposite to those in the mode 1. Referring to the schematic circuit diagram of FIG. 4A illustrating the mode 3, the current IL that is generated at the positive side of the voltage source circuit 102 flows to the negative side thereof through the reactor L, S3 and S2 in this order, as indicated by dashed arrow 401 in FIG. 4A. In this period 203 when both S2 and S3 are on, the voltage VB between the input terminals 107, 108 which are connected to the current source circuit 100 becomes zero, as shown in FIG. 2(e). The current IL flowing through the reactor L increases linearly by the application of the input voltage V1 as shown in FIG. 2(f), so that energy is accumulated in the reactor L. Like the mode 1, the mode 3 serves as the energy accumulation mode.

Figure 4B:
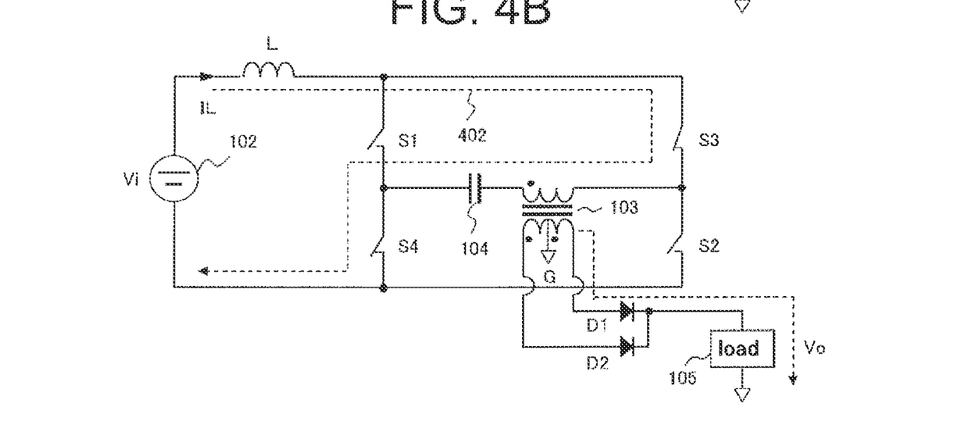

Referring to the timing chart of FIG. 2, S3 and S4 are on and S1 and S2 are off in the period 204. The period 204 will be referred hereinafter to as the mode 4. The on/off states of the switching elements S1 through S4 in the mode 4 are opposite to those in the mode 2. Referring to the schematic circuit diagram of FIG. 4B illustrating the mode 4, the energy accumulated in the reactor L in the mode 3 flows through S3, the primary coil of the transformer 103 and the capacitor 104 in this order and returns to the negative side of the voltage source circuit 102, as indicated by dashed arrow 402 in FIG. 4B. During the period 204, the energy accumulated in the reactor L is transferred from the primary coil of the transformer 103 to the secondary coil thereof. As a result, a current flows from the ground G of the secondary coil of the transformer 103 to the load 105 through the rectifier diode D1, so that an output voltage V0 is generated at the load 105. In the period 204 when S3 and S4 are on, the voltage VB between the input terminals 107, 108 which are connected to the current source circuit 100 becomes a predetermined high level voltage, as shown in FIG. 2(e), by the inductance of the capacitor 104 and the primary coil of the transformer 103. The current IL flowing through the reactor L decreases linearly, as shown in FIG. 2(f). Energy is radiated from the reactor L and transferred to the secondary coil of the transformer 103. Like the mode 2, the mode 4 serves as the energy transfer mode.

DC-DC conversion is accomplished by the operation in the modes 1 through 4 as described with reference to FIGS. 2, 3A, 3B and 4A, 4B of the current-fed full-bridge DC-DC converter shown in FIG. 1.

Figure 5:
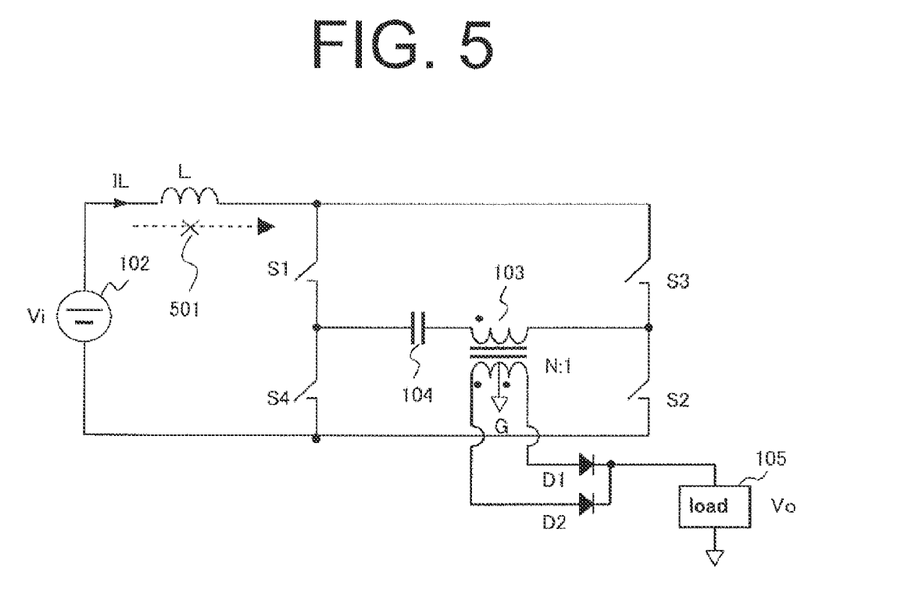
FIG. 5 is a schematic circuit diagram illustrating a problem that occurs when the current-fed full-bridge DC-DC converter of FIG. 1 is stopped.
Figure 6A:
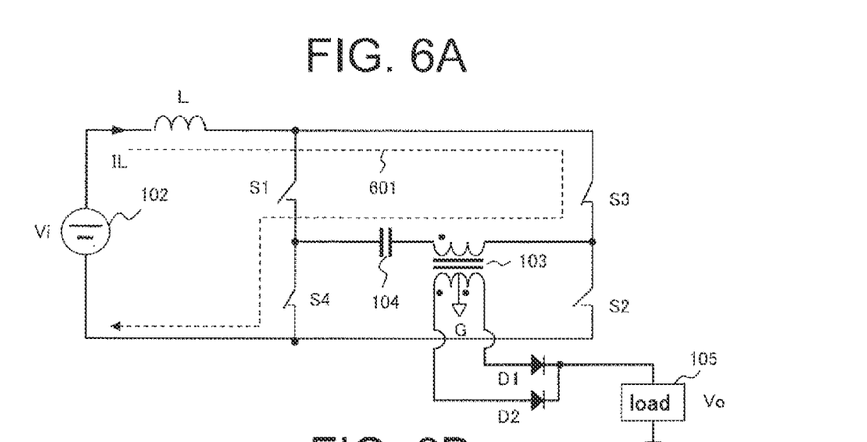
FIGS. 6A and 6B are schematic circuit diagrams illustrating the operation of the current-fed full-bridge DC-DC converter of FIG. 1 when the current-fed full-bridge DC-DC converter is stopped.
Figure 6B:
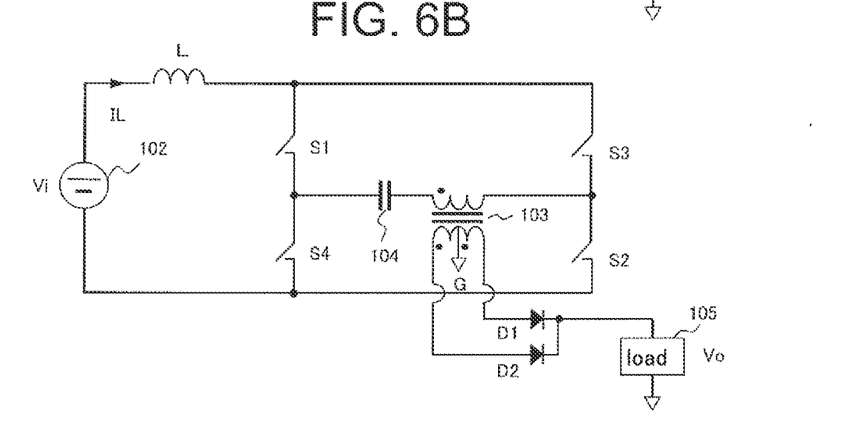

The following will describe a case where the current-fed full-bridge DC-DC converter shown in FIG. 1 need be stopped, e.g. for the protection thereof with reference to FIGS. 5 and 6A, 6B. FIG. 5 is the schematic circuit diagram illustrating a problem that occurs when the current-fed full-bridge DC-DC converter needs to be stopped. In the circuit of the current-fed full-bridge DC-DC converter shown in FIG. 1, there exists leakage inductance in the current path where the transformer 103 is connected and each of the switching elements S1 through S4 has a parasitic capacitance. During the operation in the energy accumulation mode, i.e. modes 1 and 3, energy is accumulated in the reactor L and the leakage inductance by the current flowing from the current source circuit 100. In some cases, the current-fed full-bridge DC-DC converter need be stopped, e.g. for the protection thereof, as indicated by arrow 501 in FIG. 5. If S1, S2, S3 and S4 are turned off rapidly in such a case, energy in the reactor L and the leakage inductance has nowhere to go, but is used for charging the respective parasitic capacitances of S1, S2, S3 and S4 rapidly, so that overvoltage VB is generated at S1, S2, S3 and S4. S1, S2, S3 and S4 may be broken if the overvoltage exceeds the withstand voltage of S1, S2, S3 and S4.

The following will describe the controlling that is performed by the controller 101 in the event of a stop of the above-described current-fed full-bridge DC-DC converter, with reference to FIGS. 6A and 6B. If the controller 101 receives from outside a signal indicative of a stop of the current-fed full-bridge DC-DC converter for the protection thereof or detects a state of such a stop, S1 and S2 are turned off and S3 and S4 are turned on through the control lines 106, with the result that the energy accumulated in the reactor L and the leakage inductance of the transformer 103 in the mode 1 or in the mode 3 during the normal operation of the current-fed full-bridge DC-DC converter causes a current to flow through S3, the primary coil of the transformer 103, the capacitor 104 and S4 in this order. Alternatively, the controller 101 may turns on S1 and S2 and turns off S3 and S4 through the control lines. In this case, the energy accumulated in the reactor L and the leakage inductance of the transformer 103 in the mode 1 or in the mode 3 during the normal operation of the current-fed full-bridge DC-DC converter causes a current to flow through S1, the capacitor 104, the primary coil of the transformer 103 and S2 in this order.

The capacitance of the capacitor 104 is selected suitably so that the voltage Vc generated across the capacitor 104 becomes sufficiently high. By so selecting, when a current flows through the capacitor 104 by the radiation of the energy accumulated in the reactor L and the leakage inductance of the transformer 103 in stopping of the current-fed full-bridge DC-DC converter, a voltage potential difference Vc is generated which is large enough to suppress an increase of the voltage potential difference VB between the input terminals 107, 108 which are connected to the current source circuit 100. Therefore, the current-fed full-bridge DC-DC converter according to the embodiment can suppress an increase of the overvoltage in stopping of the current-fed full-bridge DC-DC converter and protect the switching elements S1 through S4 from damage.

When the voltage across the capacitor 104 reaches the output voltage V1 of the voltage source circuit 102, the above current flowing is stopped, with the result that the operation of the current-fed full-bridge DC-DC converter is stopped, as shown in FIG. 6B.

The current-fed full-bridge DC-DC converter according to the embodiment wherein the capacitor 104 is adapted to prevent the bias magnetism and also the overvoltage and the controller 101 controls the on/off operation of the switching elements S1 through S4 appropriately in stopping of the current-fed full-bridge DC-DC converter can be made simple in structure.

What is claimed:

1. A current-fed full-bridge DC-DC converter comprising:
a current source circuit including:
  a direct-current voltage source circuit and a reactor connected to the direct-current voltage source circuit in series;
an inverter circuit including a plurality of switching elements, input terminals and output terminals, wherein outputs of the current source circuit are connected to the input terminals of the inverter circuit;
a transformer having a primary coil that is connected to the output terminals of the inverter circuit and a secondary coil; and
a rectifier circuit which is connected to the secondary coil of the transformer and through which the current-fed full-bridge DC-DC converter generates direct-current output, wherein the current-fed full-bridge DC-DC converter further includes:
a capacitor connected to the output terminal of the inverter circuit and the primary coil of the transformer in series; and
a controller controlling on/off operations of the switching elements so that a current can flow from the current source circuit through the primary coil of the transformer and the capacitor in stopping of the current-fed full-bridge DC-DC converter.

2. The current-fed full-bridge DC-DC converter according to claim 1, wherein the capacitor serves to prevent from generating overvoltage at the switching elements under control of the controller.

3. The current-fed full-bridge DC-DC converter according to claim 1, wherein the capacitor also serves to prevent bias magnetism generated by exciting inductance of the transformer.

* * * * *